(12) United States Patent
Chen et al.

(10) Patent No.: US 8,798,204 B2
(45) Date of Patent: Aug. 5, 2014

(54) SERIAL LINK RECEIVER FOR HANDLING HIGH SPEED TRANSMISSIONS

(75) Inventors: Minhan Chen, Cary, NC (US); Hayden C. Cranford, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 13/228,512

(22) Filed: Sep. 9, 2011

(65) Prior Publication Data

US 2013/0064326 A1    Mar. 14, 2013

(51) Int. Cl.
*H03K 9/00* (2006.01)
*H04B 3/00* (2006.01)

(52) U.S. Cl.
USPC .......................................... 375/316; 375/257

(58) Field of Classification Search
USPC ......................... 375/316, 257, 258
See application file for complete search history.

(56) References Cited

U.S. PATENT DOCUMENTS

| | | | |
|---|---|---|---|
| 5,684,429 A | 11/1997 | Sanwo et al. | |
| 6,968,413 B2 | 11/2005 | Cranford, Jr. et al. | |
| 7,043,041 B2 | 5/2006 | Svajda et al. | |
| 7,088,270 B1 | 8/2006 | Dally et al. | |
| 7,248,035 B2 | 7/2007 | Babcock et al. | |
| 7,332,932 B2 | 2/2008 | Cranford et al. | |
| 7,463,112 B1 | 12/2008 | Groves | |
| 7,519,130 B2 * | 4/2009 | Hsu et al. | 375/292 |
| 7,706,473 B2 | 4/2010 | Felder et al. | |
| 7,843,236 B2 | 11/2010 | Chang et al. | |

OTHER PUBLICATIONS

Cheema, et al., "A 40 GHz, Broadband, Highly Linear Amplifier, Employing T-coil Bandwidth Extension Technique", RTUIF-19, 2008 IEEE Radio Frequency Integrated Circuits Symposium (downloaded on May 8, 2009), pp. 645-648.

Galal, et al., "ISSCC 2003 / Session 10 / High Speed Building Blocks / Paper 10.5—10.5 Broadband ESD Protection Circuits in CMOS Technology", Electrical Engineering Department, University of California, Los Angeles, CA, Feb. 11, 2003, 10 pages.

Kim, et al., "Design of a Reliable Broadband I/O Employing T-coil", Manuscript received Aug. 23, 2009; revised Nov. 1, 2009. Department of Semiconductor Systems Engineering, Sungkyunkwan, University, Suwon, Korea, Journal of Semiconductor Technology and Science, vol. 9, No. 4, Dec. 2009, pp. 198-204.

* cited by examiner

*Primary Examiner* — Tesfaldet Bocure
(74) *Attorney, Agent, or Firm* — H. Daniel Schnurmann; Jeffrey L. Streets

(57) ABSTRACT

A serial link receiver comprises first and second input terminals for receiving positive and negative inputs of a serial data signal, first and second broadband matching T-coils coupled to the first and second input terminals, first and second AC/DC coupling networks coupled to the first and second broadband matching T-coils, and a common mode level shifter coupled to the outputs from the first and second AC/DC coupling networks. This receiver architecture combines the ability to have a wide bandwidth input and pass through data signals at both low and high frequencies. This AC and DC coupled front end also incorporates the feature of a common mode level shifting network to place the common mode of the signal at the optimum point for the first active amplifier stage.

18 Claims, 4 Drawing Sheets

SERIAL LINK RECEIVER FOR HANDLING HIGH SPEED TRANSMISSIONS

BACKGROUND

1. Field of the Invention

The present invention relates to serial link receivers, and more specifically related to receivers for high speed serial data transmissions.

2. Background of the Related Art

Computers and related telecommunications equipment use serial communications to send data in a sequence one bit at a time. Serial communications have come into wide use over long and short distances as a result of good signal integrity and high transmission speeds. For example, PCI Express (PCIe) is a popular computer expansion card standard that provides high speed serial communications. PCIe is used in many applications, including its use as a motherboard-level interconnect.

As the data rate increases in high speed serial data communications, the loss due to the capacitive load at the front end of the receiver increases and the bandwidth becomes limited. For different high speed low power communication standards, there is a wide input common mode range. The input common mode range of a conventional receiver is limited due to the direct connection of the amplifier to the input voltages, known as DC coupled connection. A small input common mode range limits the flexible combination of drivers and receivers made in different technologies. For some communication standards, AC coupled scheme is advantageous for filtering out low frequency noise and reducing input common mode level demand. However, it requires that the data signal be transmitted frequently between "1"s and "0"s. The receiver with AC coupled front end can not properly decode a signal which has a long consecutive string of "1"s and "0"s. For this type of the data pattern, a DC coupled front end is more appropriate.

BRIEF SUMMARY

One embodiment of the present invention provides a serial link receiver for handling high speed data transmissions. The serial link receiver comprises a first receiver input terminal coupled to an input terminal of a first T-coil including first and second inductors connected in series, wherein an output terminal of the T-coil is coupled to a first termination resistor, and wherein a terminal between the first and second inductors is coupled to an input of a first AC/DC coupling network. The serial link receiver further comprises a second receiver input terminal coupled to an input terminal of a second T-coil including third and fourth inductors connected in series, wherein an output terminal of the T-coil is coupled to a second termination resistor, and wherein a terminal between the third and fourth inductors is coupled to an input of a second AC/DC coupling network. The first termination resistor and the second termination resistor are coupled in series with a terminal between the first and second termination resistors, wherein that terminal is coupled to the termination voltage of the receiver. Still further, the serial link receiver comprises a common mode level shifter having a first input coupled to an output from the first AC/DC coupling network and a second input coupled to an output from the second AC/DC coupling network.

DETAILED DESCRIPTION

Figure 1A:
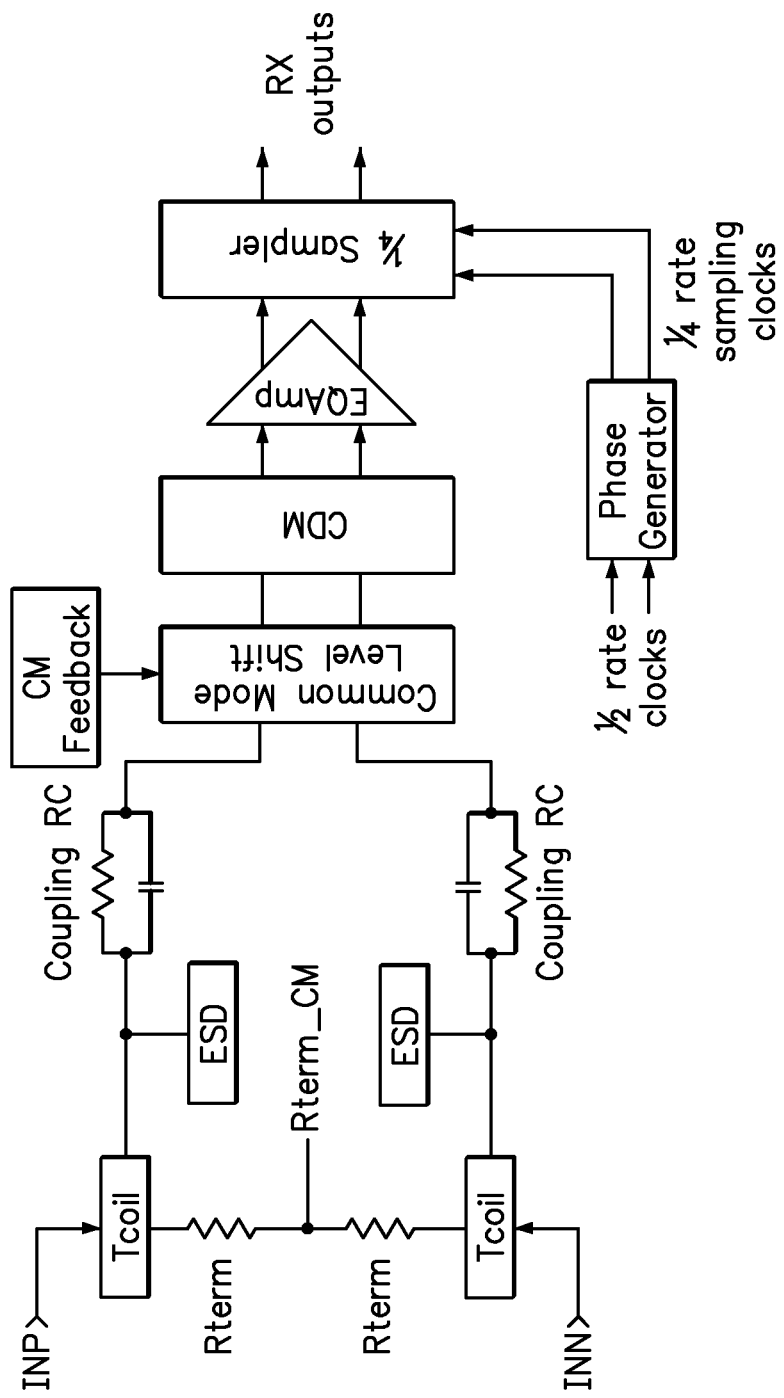
FIG. 1A is a functional block diagram of a serial link receiver.

The present invention provides various embodiments of a serial link receiver. One serial link receiver comprises first and second input terminals for receiving positive and negative inputs of a serial data signal, first and second broadband matching T-coils coupled to the first and second input terminals, first and second AC/DC coupling networks coupled to the first and second broadband matching T-coils, and a common mode level shifter coupled to the outputs from the first and second AC/DC coupling networks.

Each T-coil is preferably a three terminal on-chip inductor circuit connected to an on-chip termination resistor. Each T-coil includes two inductors coupled in series. An input terminal to the first of the series inductors is connected to the input ("INP") to the receiver, which may be a chip C4 package pin of the receiver. An output terminal or pin is connected from the second of the series inductors to the on chip termination resistor. The center tap terminal or pin extends from the mid point between the two inductors, and is connected to the input of an AC/DC coupling network. The output of the AC/DC coupling network is then connected to the input of the Common Mode Level Shifter and also connected to the input of the equalized amplifier.

The termination resistor from the first T-coil is coupled to the termination resistor from the second T-coil. The mid point of the two series connected termination resistor is connected to the termination voltage of the receiver. A preferred embodiment of a broadband matching T-coil and R/C coupling network has a data transport bandwidth that ranges from DC to 6 Gbps.

The AC/DC coupling network includes a resistor in parallel with a capacitor. The resister preferably has a resistance from 300 Ohms ($\Omega$) to 30,000 Ohms. The capacitor preferably has a capacitance from 0.3 picoFarads (pF) to 10 pF. For example, one suitable AC/DC coupling network includes a 3,000$\Omega$ resistor in parallel with a 2.7 pF capacitor. One purpose of the AC/DC coupling network is that it allows passing data with both short and long transition bit patterns. A short transition bit pattern includes frequent changes from "1"s to "0"s, such as in the bit pattern 101010. A long transition bit pattern has many consecutive "1"s or "0"s, such as in the bit patterns 1111111 … 1 or 0000000 … 0. Having many consecutive bits of the same value makes the signal pattern constant like a direct current (DC) signal. A short transition bit pattern requires high frequency bandwidth to pass, whereas a long transition bit pattern requires that the pass band frequency extend to a very low frequency, up to DC.

The common mode level shifter can handle both low input common mode signals (power ground) and high input common mode signals (power supply). In other words, the "low" common mode signal can reach as low as ground, and the "high" common mode signal can reach as high as the voltage limits of the receiver's power supply.

The serial link receiver may further comprise a protection structure coupled to a link between the T-coil and the AC/DC coupling network. The protection structure may, for example, be an electrostatic discharge (ESD) clamping diode or a charged device mechanism (CDM) protection structure.

This receiver architecture combines the ability to have a wide bandwidth input (via the broadband matching T-coil network) with a parallel resistor/capacitor (R/C) network to allow the data signal to pass through for both low and high frequencies. This AC and DC coupled front end also incorporates the feature of a common mode level shifting network to place the common mode of the signal at the optimum point for the first active amplifier stage. The combination of these features extends the input common mode range, improves the high bandwidth, maintains the correct input return loss of the data path (expressed as a ratio in dB), and allows passing the data with both short transition bit patterns and long transition bit patterns. This means that the R/C network can be "tuned" so that all possible frequencies created by the data are passed with low return loss. A "return loss" is the loss of signal power resulting from a reflection caused at a discontinuity in a transmission line. This discontinuity can be a mismatch with the terminating load or with a device inserted in the line. One preferred topology of the invention is shown generally in FIG. 1A and specifically in FIG. 1B.

FIG. 1A is a functional block diagram of a serial link receiver front end. The receiver front end includes a first broadband matching T-coil having an input coupled to positive input (C4INP) (the chip C4 package pin of the receiver) of a serial communication line and a second broadband matching T-coil having an input coupled to a negative input (C4INN) of the serial communication line. A mid tap point of each T-coil is coupled to an AC/DC coupling network, shown here as a resistor and capacitor in parallel (i.e., "Coupling RC"). Still further, ESD protection structures are coupled to each of the links from the T-coils to the AC/DC coupling networks. The outputs of the two AC/DC coupling networks are input to a common mode level shifter. After the input signals from the C4INP and C4INN passes through the T-coils, AC/DC coupling networks, and common mode level shifter, the signals reach the input of a charged device mechanism (CDM) protection structure, and the input of a programmable RX equalizer (EQAmp), in which the incoming data is amplified and equalized. The CDM structure protects the receiver, including EQAmp, from charging/discharging events that occur in production equipment and processes. Potential for CDM ESD events occur when there is metal-to-metal contact in manufacturing. One of many examples is a device sliding down a shipping tube and hitting a metal surface. The CDM addresses the possibility that a charge may reside on a lead frame or package and discharge through a pin that subsequently is grounded. The discharge current is limited only by the parasitic impedance and capacitance of the device. While the CDM protects the functional block of the receiver, it adds parasitic capacitance loading to the input of the EQAmp. This parasitic capacitance loading limits the bandwidth and causes the high return loss of the receiver. A broadband matching network with T-coil is used to compensate for the parasitic capacitance effect and reduce the return loss of the receiver. The programmable RX equalizer, EQAmp, is an amplifier with a high pass frequency response to equalize the low pass response of the data communication channel. The high pass frequency response of the EQAmp can be characterized as the amount of the peaking in dB at a given frequency. The peaking of the RX equalizer is generated by a gmC type of high pass filter. The amount of the peaking is controlled by a capacitor network and is programmable, therefore called a programmable RX equalizer. With the programmable equalizer, the signal loss due to the communication channel is recovered (equalized) such that the high sensitivity of the receiver (RX) is achieved.

The common mode level shift network with AC/DC coupling network de-couples the receiver (RX) internal common mode level at the input of the amplifier from the external common mode voltage at Rterm_CM. The external common mode voltage at Rterm_CM varies from the ground to the receiver power supply in different applications. The RX internal common mode voltage is shifted to a level suitable for an NFET-based differential pair amplifier with load resistors connected to power supply in both cases of the high external common mode and the low external common mode in the multi-standards, for example, PGI2 5.0 Gbps, C2C 4.8 Gbps, and/or CEI 6.4 Gbps applications.

The serial link receiver shown in FIG. 1A provides a broadband matching T-coil network, AC/DC coupled front end, and a common mode level shifter to extend the input common mode range, provide high bandwidth and low return loss of the data path, and allow the data to pass with both short transition bit patterns and long transition bit patterns.

The common mode feedback (CMFB) circuit and the common mode level shifter, shown in FIG. 1A, are used to set the input common mode voltage of the EQAmp to a level which is favorable to the performance of the EQAmp. A more detailed functional description of CMFB and common mode level shifter is facilitated by discussing these circuits as three parts, shown in FIG. 1B. Part 1 is a sensing network formed by two 15K resistors, Rcm. These two resistors sense (or evaluate) the common mode voltage of the input signal of the EQAmp, called RX_CM. Part 2 is a common mode comparator by the Common Mode Feedback Amplifier (CMFB). The comparator has a high gain and low input referred offset. The common mode voltage of the input signal of the EQAmp, RX_CM as an input of the CMFB, is compared to a target common mode voltage as another input of the amplifier CMFB. The target common mode voltage comes from a reference generator, Vref Gen, which generate a reference voltage of 0.7 (70%) of the receiver power supply. For example, if VTR represents the voltage of the receiver power supply, then the reference voltage (the target common mode voltage) is 0.7*VTR. The output of the CMFB comparator indicates whether the common mode voltage of the input signal of the EQAmp is higher or lower than the target common mode voltage. Part 3 is a voltage-controlled current source and/or sink (the structures adjacent the wording "to EQAmp) to shift the common mode voltage of the input signal of the EQAmp to the target level. Through the sensing network formed by two 15K resistors, Rcm, if the input common mode voltage of the EQAmp, RX_CM, is higher than the target value, then the output of the common mode comparator, CMFB, controls the current sink in order to sink a DC current, thereby lowering the input common mode voltage of the EQAmp, RX_CM, until it reaches its target value. If the input common mode voltage of the EQAmp, RX_CM, is lower than the target value, then the output of the common mode comparator, CMFB, controls the current source to supply a DC current, thereby raising the input common mode voltage of the EQAmp, RX_CM, until it reaches its target value.

Figure 1B:
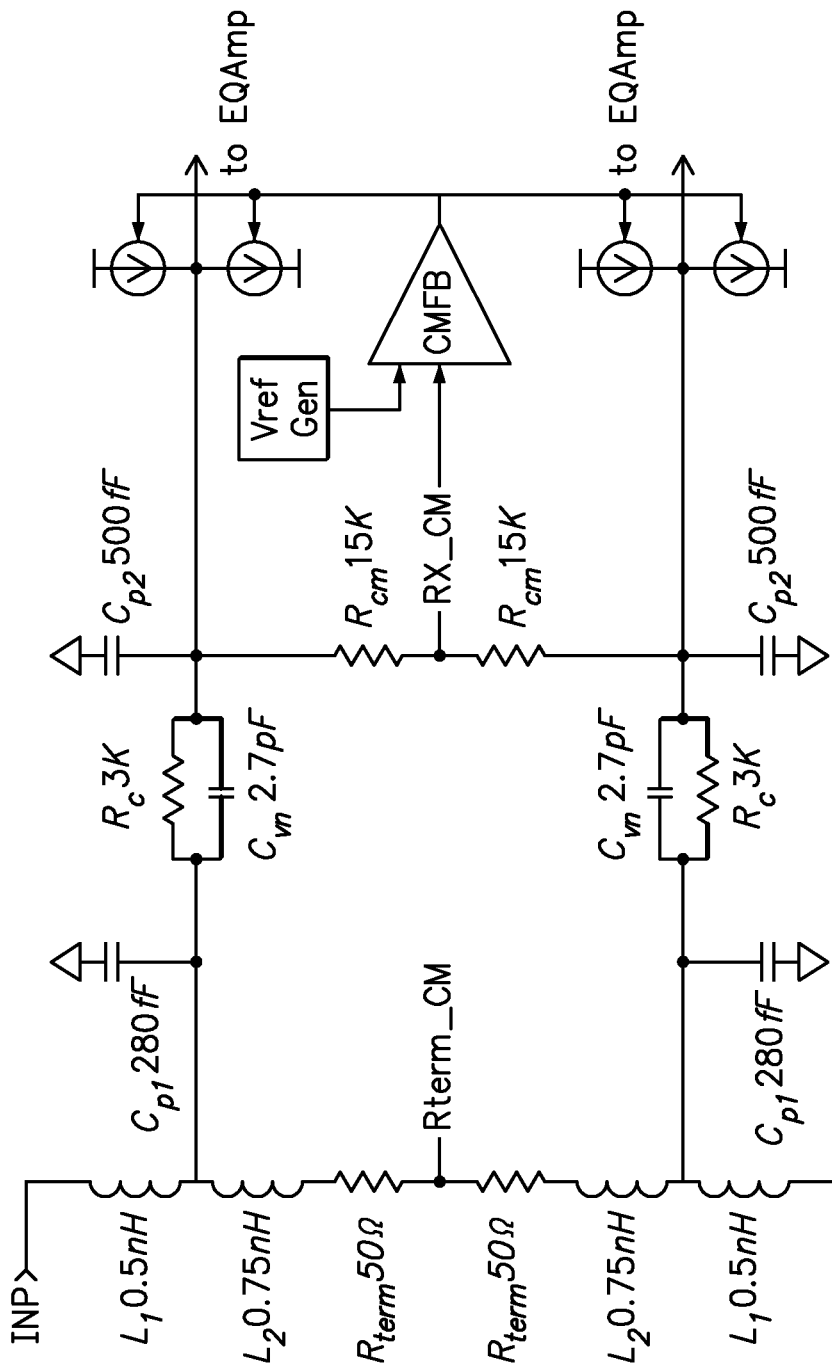
FIG. 1B is a linear equivalent circuit of the front end of the receiver in FIG. 1A.

FIG. 1B is a non-limiting example of a linear equivalent circuit of the receiver front end of FIG. 1A, from the receiver inputs, INP and INN, to the Common Mode Level Shift. FIG. 1B omits the CDM, EQAmp, Sample, Phase Generator, and ESD shown in FIG. 1A. Each of the Tcoils is a three terminal on chip inductor that is connected with on chip termination resistor, Rterm, to form a broadband impedance matching network. The broadband impedance matching network compensates for the signal loss that is due to parasitic capacitance at the input of the receiver and, as a result, improves the bandwidth and return loss.

Each T-coil is a three terminal on-chip inductor circuit connected to a termination resistor. Each T-coil includes two inductors coupled in series. An input terminal to the first of the series inductors is connected to the input ("INP") to the receiver. An output terminal is connected from the second of the series inductors to the termination resistor. The center tap terminal extends from a point between the two inductors, and is connected to the input of an AC/DC coupling network. The output of the AC/DC coupling network is then connected to the input of the Common Mode Level Shifter and also connected to the input of the equalized amplifier.

The termination resistor from the first T-coil is coupled to the termination resistor from the second T-coil. The mid point of the two series connected termination resistors is connected to the termination voltage of the receiver. A preferred embodiment of a broadband matching T-coil and R/C coupling network has a data transport bandwidth that ranges from DC to 6 Gbps.

In the embodiment shown, the RC coupling network provides a dual AC/DC coupling path to the internal amplifying stage, EQAmp. Each AC/DC coupling path includes a 3,000Ω resistor in parallel with a 2.7 pF capacitor. At low frequency, the RX input signal is coupled into the input of the EQAmp through the 3,000Ω resistor, Rc. At high frequency, the RX input signal is coupled into the input of the EQAmp through the 2.7 pF capacitor, Cvn, in parallel with the resister. Persons that are skilled in the art will recognize that the invention is not limited to specific values of resistance and capacitance.

FIG. 1B is a linear equivalent circuit and shows capacitors Cp1 and Cp2 which represent the loading capacitance that is due to the parasitic effect of the ESD, coupling RC network, Common Mode Level Shifter, CDM, and EQAmp. The parasitic loading capacitance limits the bandwidth and causes the receiver to have a high return loss. The T-coil with the termination resistor is used to compensate for the effect of the parasitic loading capacitance (illustrated as Cp1 and Cp2) to form a receiver having a broadband matching network and reduced return losses. The primary component contributed by the ESD and RC coupling network to affect the character of the receiver front end is lumped into the parasitic loading capacitance Cp1. The key component contributed by the RC coupling network, Common Mode Level Shifter, CDM, and EQAmp to affect the character of the receiver front end is lumped into another parasitic loading capacitance Cp2. In other words, Cp1 just represents the loading parasitic capacitance effect contributed by ESD. As non-limiting examples, the capacitance Cp1 is shown as being about 280 femtofarads (fF) and the capacitance Cp2 is shown as being about 500 fF, but the capacitance values may vary.

Figure 2:
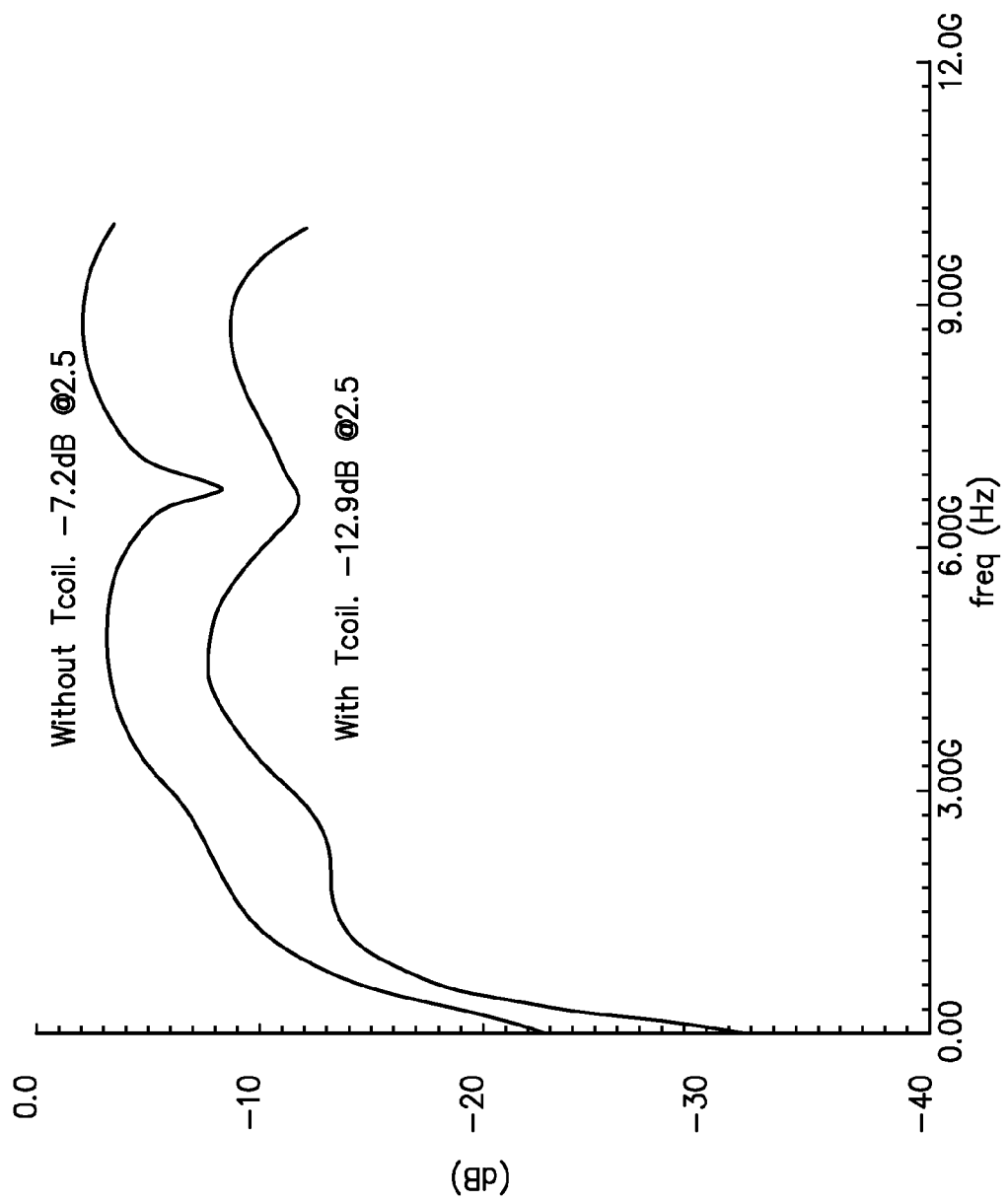
FIG. 2 is a graph of decibels as a function of frequency showing the return loss experienced by the receiver with the Tcoil broadband impedance matching network is much smaller than for the receiver without such a circuit.

FIG. 2 is a graph of decibels as a function of frequency showing the return loss experienced by the receiver with and without the Tcoil broadband impedance matching network. The x-axis represents the frequency of the input data signal from 0 to 12 GHz. The y-axis represents the return loss from −40 decibels (dB) to 0 dB. The upper curve is the return loss for a receiver without the T-coil broadband matching network. In the receiver without the T-coil, the inputs INP/INN are coupled directly to the RC coupling networks and the 50 Ohm termination resistor. The lower curve is the return loss for the receiver of FIG. 1B with the T-coil broadband matching network. A low return loss, indicated by points lower on the curve near the x-axis, means that the signal power has lower return losses during transmission.

A receiver having lower return loss will have better performance. The 5G PCIe standard, for example, requires that a receiver have a return loss that is less than −10 dB at 2.5 Ghz. The receiver without a T-coil broadband matching network exhibits a return loss at 2.5 Ghz that is only −7.2 dB, not meeting the 5G PCIe standard. By contrast, the receiver with the T-coil broadband matching network meets this standard by exhibiting a return loss at 2.5 Ghz that is −12.9 dB.

Figure 3:
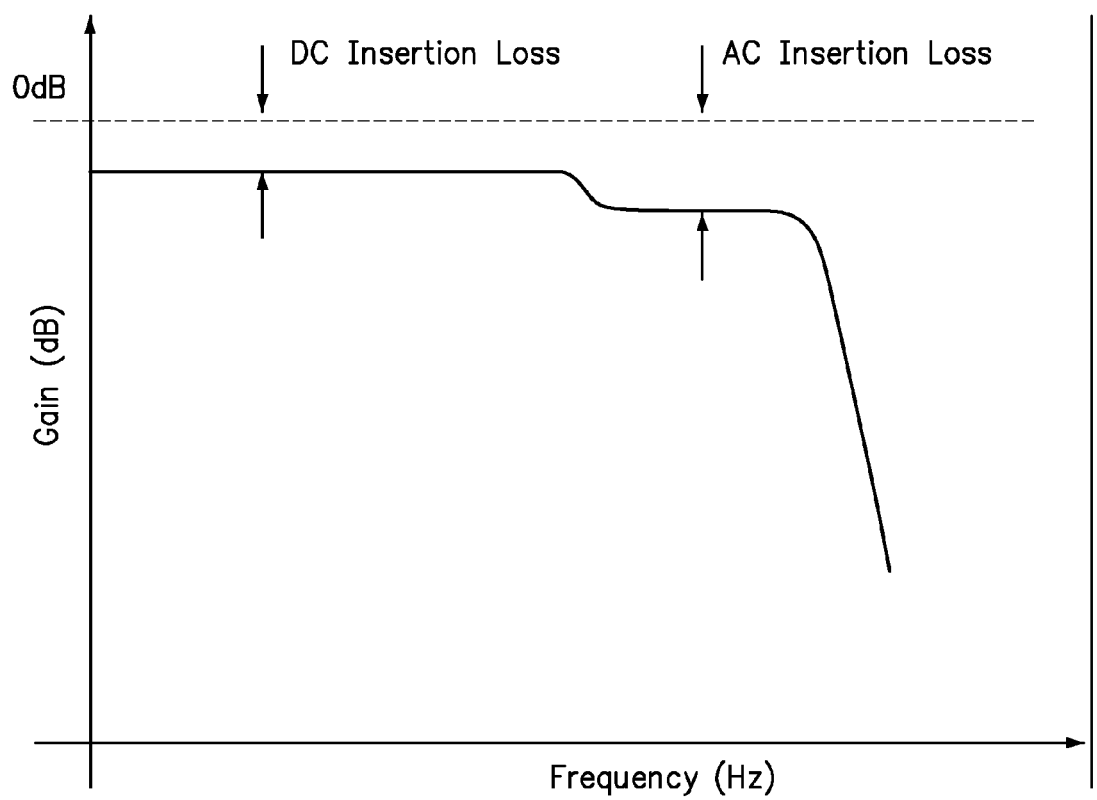
FIG. 3 is a graph of decibels as a function of frequency showing that there is only a small amount of DC insertion loss and AC insertion loss for the serial link receiver of FIG. 1B.

FIG. 3 is a theoretical representation of decibels as a function of frequency showing the DC insertion loss and AC insertion loss for the serial link receiver of FIG. 1B. An "insertion loss" is the loss of signal power resulting from the insertion of a receiver in a transmission line. DC insertion loss is the loss of signal power at low frequency bands from 0 Hz to 10 Khz. AC insertion loss is the loss of signal power at high frequency bands from 100 Khz to 20 Ghz and beyond. FIG. 3 shows that the DC insertion loss and the AC insertion loss are both under control and small. Signals from input of the receiver can couple into the input of the equalization amplifier though the T-coil broadband matching network, AC/DC coupling network, ESD/CDM protection structures, and common mode level shift network without much loss from DC signals (low frequency) to AC signals (high frequency). Therefore signals with both "long" and "short" bit patterns can pass through the front end of the receiver to reach the amplifier stage without much loss.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A serial link receiver for handling high speed data transmissions, comprising:
    a first receiver input terminal coupled to an input terminal of a first T-coil including first and second inductors connected in series, wherein an output terminal of the T-coil is coupled to a first termination resistor, and wherein a terminal between the first and second inductors is coupled to an input of a first AC/DC coupling network;

a second receiver input terminal coupled to an input terminal of a second T-coil including third and fourth inductors connected in series, wherein an output terminal of the T-coil is coupled to a second termination resistor, and wherein a terminal between the third and fourth inductors is coupled to an input of a second AC/DC coupling network;

wherein the first termination resistor and the second termination resistor are coupled in series with a terminal between the first and second termination resistors coupled to the termination voltage of the receiver; and a common mode level shifter having a first input coupled to an output from the first AC/DC coupling network and a second input coupled to an output from the second AC/DC coupling network.

2. The serial link receiver of claim 1, wherein the T-coil and the AC/DC coupling network has a data transport bandwidth that ranges from direct current to 6 Gbps.

3. The serial link receiver of claim 1, wherein the common mode level shifter can handle input common mode signals from power ground to the voltage limits of the power supply.

4. The serial link receiver of claim 1, wherein each of the first and second AC/DC coupling networks includes a resistor in parallel with a capacitor.

5. The serial link receiver of claim 4, wherein the resisters in the first and second AC/DC coupling networks each have a resistance from 300 Ohms to 30,000 Ohms.

6. The serial link receiver of claim 4, wherein the capacitors in the first and second AC/DC coupling networks each have a capacitance from 0.3 picofarads to 10 picofarads.

7. The serial link receiver of claim 1, wherein each of the first and second AC/DC coupling networks includes a 3,000 Ohm resistor in parallel with a 2.7 picofarad capacitor.

8. The serial link receiver of claim 1, wherein the AC/DC coupling network allows passing data with both short and long transition bit patterns.

9. The serial link receiver of claim 1, further comprising:
an electrostatic discharge protection structure coupled to a link between the T-coil and the AC/DC coupling network.

10. The serial link receiver of claim 9, wherein the electrostatic discharge protection structure is an electrostatic discharge (ESD) clamping diode or a charged device mechanism (CDM) protection structure.

11. The serial link receiver of claim 1, characterized by a return loss at the input of the receiver of less than −10 dB at 2.5 GHz.

12. The serial link receiver of claim 1, further comprising:
a first charged device mechanism (CDM) protection structure coupled to a first output of the common mode level shifter; and
a second charged device mechanism (CDM) protection structure coupled to a second output of the common mode level shifter.

13. The serial link receiver of claim 1, further comprising:
an equalized amplifier having a first input coupled to a first output of the common mode level shifter and a second input coupled to a second output of the common mode level shifter.

14. The serial link receiver of claim 1, further comprising:
a common mode feedback circuit in electronic communication with the common mode level shifter, wherein the common mode level shifter sets the input common mode voltage of the EQAmp to a target common mode voltage.

15. The serial link receiver of claim 1, further comprising:
a sensing network including two resistors that sense the common mode voltage of the input signal to the EQAmp; and
a common mode comparator having a first input coupled to the common mode voltage and a second input coupled to a target common mode voltage generator.

16. The serial link receiver of claim 15, wherein the target common mode voltage generator generates a target voltage that is seventy percent of the voltage of a receiver power supply.

17. The serial link receiver of claim 15, wherein the comparator produces an output that indicates whether the common mode voltage of the input signal of the EQAmp is higher or lower than the target common mode voltage.

18. The serial link receiver of claim 15, further comprising:
a voltage-controlled current source or current sink coupled to the output of the comparator to shift the common mode voltage of the input signal to the EQAmp to the target common mode voltage.

* * * * *